United States Patent [19]
Martinez et al.

[11] Patent Number: 5,496,642
[45] Date of Patent: * Mar. 5, 1996

[54] LOW VOC, FLUOROCOMPOUND-CONTAINING ONE-COMPONENT AND TWO-COMPONENT COATING COMPOSITIONS FOR SLIPPERY COATINGS

[75] Inventors: Michael M. Martinez, Fairporte, N.Y.; Adam G. Malofsky, Huntington, Conn.; Kiran B. Chandalia, Cheshire, Conn.; Fred A. Stuber, North Haven, Conn.

[73] Assignee: Olin Corporation, Cheshire, Conn.

[*] Notice: The portion of the term of this patent subsequent to Dec. 6, 2011, has been disclaimed.

[21] Appl. No.: 239,883

[22] Filed: May 9, 1994

[51] Int. Cl.$^6$ .......................... B32B 27/00; B32B 27/40
[52] U.S. Cl. .................. 428/423.1; 428/421; 428/422.8; 427/385.5; 521/49; 521/49.5; 528/45; 528/67; 528/73
[58] Field of Search ................. 521/49, 49.5; 428/423.1, 428/422.8; 520/45, 67, 73; 427/385.5; 528/45, 67, 73

[56] References Cited

U.S. PATENT DOCUMENTS

| | | | |
|---|---|---|---|
| 2,978,449 | 4/1961 | France et al. | 260/248 |
| 3,645,979 | 2/1972 | Liebsch et al. | 260/77.5 |
| 3,745,133 | 7/1973 | Comunale et al. | 260/2.5 |
| 3,981,829 | 9/1976 | Cenker et al. | 260/2.5 |
| 3,996,223 | 12/1976 | Gupta et al. | 260/248 |
| 4,067,830 | 1/1978 | Kresta | 260/2.5 |
| 4,115,373 | 9/1978 | Henes et al. | 528/48 |
| 4,292,350 | 9/1981 | Kubitza et al. | 427/385.5 |
| 4,324,879 | 4/1982 | Bock et al. | 528/45 |
| 4,412,073 | 10/1983 | Robin | 544/193 |
| 4,454,317 | 6/1984 | Disteldorf et al. | 544/193 |
| 4,456,658 | 6/1984 | Kubitza et al. | 428/424.6 |
| 4,525,305 | 6/1985 | Patel | 260/401 |
| 4,614,785 | 9/1986 | Richter et al. | 528/45 |
| 4,782,175 | 11/1988 | Wehowsky et al. | 560/26 |
| 4,801,663 | 1/1989 | Ueyanagi et al. | 525/528 |
| 4,804,709 | 2/1989 | Takago et al. | 525/102 |
| 5,057,377 | 10/1991 | Karydas et al. | 428/447 |
| 5,100,962 | 3/1992 | Sawada et al. | 525/125 |
| 5,124,427 | 6/1992 | Potter et al. | 528/67 |
| 5,142,011 | 8/1992 | Shimizu et al. | 526/249 |
| 5,144,031 | 9/1992 | Pedain | 544/193 |
| 5,171,877 | 12/1992 | Knaup et al. | 560/26 |
| 5,216,081 | 6/1993 | Mohri et al. | 525/199 |
| 5,370,908 | 12/1994 | O'Connor et al. | 427/385.5 |

FOREIGN PATENT DOCUMENTS

0480089A1  4/1992  European Pat. Off.

*Primary Examiner*—James J. Seidleck
*Assistant Examiner*—Duc Truong
*Attorney, Agent, or Firm*—Dale L. Carlson

[57] ABSTRACT

This invention relates to one-component and two-component heat-curable or moisture-curable coating compositions, and processes for their use in providing a slippery coating on a substrate utilizing a polyisocyanate-based low VOC coating composition, employing a fluoro-containing active hydrogen-containing compound, and which is suitably rapidly hardened under the influence of heat or moisture.

11 Claims, No Drawings

5,496,642

1

LOW VOC, FLUOROCOMPOUND-CONTAINING ONE-COMPONENT AND TWO-COMPONENT COATING COMPOSITIONS FOR SLIPPERY COATINGS

FIELD OF THE INVENTION

This invention relates generally to one-component and two-component heat-curable or moisture-curable coating compositions for providing a slippery coating on a substrate, and, more specifically to a process for coating substrates with a coating composition containing a low or nil concentration of volatile organics (so-called "low VOC", containing, at most, a low amount of organic solvent) and which is suitably rapidly hardened under the influence of heat or moisture.

BACKGROUND OF THE INVENTION

The use of fluorine-containing compounds in preparing coatings having a slippery outer surface is known in the art. By way of illustration, European Patent Application publication No. 480,089, published on Apr. 15, 1992 discloses the reaction of isophorone diisocyanate ("IPDI") with a fluorine-containing monoalcohol ("monol") in order to prepare a fluoro-modified urethane for use as a resin modifier by grafting onto a fluoroolefin-vinyl ether copolymer resin. The modified resin was subsequently used in accordance with the disclosures of the '089 publication to modify a coating composition comprising the modified resin having a 50% solids content, and coated substrates were prepared and their physical properties measured. The '089 publication also discloses, at page 12 thereof, a "wish-list" of conventional film-forming resins suitable for use in combination with the modified resin in coating compositions, including polyurethane resins.

The use of moisture-curable one-component and two-component isocyanate-based coating compositions in the production of coatings for substrates is also known in the art. As an illustration of a one-component system, U.S. Pat. No. 4,456,658 discloses a process for coating polyvinyl chloride sheet products with a moisture-curable, clear coating comprising a binder which consists essentially of at least one polyisocyanate which is liquid at room temperature. The polyisocyanate binder is further characterized at column 2, lines 12–17 of the '658 patent as being in particular polyisocyanates containing biuret or isocyanurate groups and optionally uretidione groups and having an average isocyanate functionality above 2, preferably from about 2.5 to 6. Unfortunately, the '658 patent is limited to coating polyvinyl chloride sheet products, which represents a narrow market niche as compared to the wide variety of substrates in the marketplace that could benefit from a suitable one-component coating. The coating compositions of the examples of the '658 patent also have the disadvantage of slow drying times when cured with atmospheric moisture at room temperature.

As an additional illustration, U.S. Pat. No. 4,292,350 discloses a process of coating substrates comprising applying to the substrate a moisture-curable, solvent-free or low solvent lacquer composition containing as a binder an isocyanate mixture. The isocyanate mixture described in the '350 patent is a mixture of (a) an organic polyisocyanate having an average isocyanate functionality of greater than 2 which contains biuret, urethane and/or isocyanurate groups and has an isocyanate content of from about 13 to 30% by weight, and (b) at least one monoisocyanate having a defined structure. The monoisocyanate is further described at column 3, lines 18–22 of the '350 patent as being suitably prepared by reacting excess quantities of a diisocyanate with a hydrocarbon-containing hydroxyl compound, followed by removal of unreacted excess diisocyanate by distillation using, for example, a thin layer evaporator. The process of this patent is more cumbersome than might be desired, particularly in regard to the need for the isocyanate mixture and the need for removal of excess diisocyanate from the prepared monoisocyanate component.

Conventional methods for the heat-curing of monomeric diisocyanates have frequently posed toxicity concerns that are typically associated with employee exposure by the end user to volatile monomeric diisocyanates.

Recent efforts have been made to overcome these toxicity concerns; however, other problems tend to occur. By way of illustration, U.S. Pat. No. 5,144,031 discloses both heat-crosslinkable, one-component blocked-isocyanate compositions and two-component coating compositions which are said to harden at room temperature or at a slightly elevated temperature. The coating compositions of the '031 patent contain isocyanurate group-containing polyisocyanates produced by the steps of: (a) partially trimerizing the isocyanate groups of a cycloaliphatic diisocyanate in the presence of a trimerization catalyst and optionally in the presence of an inert solvent, (b) terminating the trimerization reaction at the desired degree of trimerization, (c) removing unreacted starting diisocyanate and any other volatile constituents, and (d) prior to step (c), adding 1 to 30 % by weight of a monohydric alcohol being an ester alcohol, based upon the weight of the diisocyanate. Unfortunately, this process is more complicated than might be desired, particularly with the requirement for the step (c) removal of unreacted starting diisocyanate after addition of the monohydric alcohol. In addition, the presence of the ester alcohol necessitates that a urethanization reaction takes place at the site of the ester alcohol on the prepolymer, in addition to the trimerization reaction that takes place with respect to the isocyanate moieties, rendering a more complex reaction sequence than might be desired.

Recently, new processes for providing low VOC one-component and two-component heat or moisture curable urethane coatings based on organic polyisocyanates, and advantageously employing dimers, trimers, or biurets of aliphatic diisocyanates, have been disclosed, for example, in commonly-assigned, co-pending U.S. application Ser. Nos. 08/065,005 (filed on May 24, 1993 and claiming low VOC, 1-K moisture curable coating compositions), 08/064,996 (filed on May 24, 1993 and claiming low VOC, 2-K moisture curable coating compositions), and 08/065,009 (filed on May 24, 1993 and claiming low VOC, 1-K and 2-K heat curable coating compositions). The processes disclosed in these copending applications, although useful for coating a wide variety of substrates, not limited to the polyvinyl chloride substrate of the '658 patent and not employing the isocyanate mixture of the '350 patent, have the disadvantage of not always providing as "slippery" a coating as otherwise might be desired in use, for example, as an automotive top-coat, clear-finish coating. Accordingly, new coating compositions and processes providing the desired slipperiness characteristics for the coating's outer surface, without compromising good substrate adhesion characteristics between the coating and the underlying substrate, would be highly desired by the coatings manufacturing community. The present invention provides one solution to this industry need. The present invention also provides a solution to the toxicity problem that can be associated with monomeric diisocyanates by employing a low toxicity coating composition that is also low in VOC.

SUMMARY OF THE INVENTION

In one aspect, the present invention relates to a low volatile-organics, one-component, heat curable coating composition having a viscosity as measured by ZAHN cup 2 of less than about 200 seconds and consisting essentially of at least one blocked polyisocyanate, a fluorine-containing active hydrogen-containing compound alone or in combination with a fluorine-free active hydrogen-containing compound, a solvent in an amount of between 0% and 45% by weight based upon the amount of said polyisocyanate in said composition, and a trimerization catalyst, said composition being essentially free of any mono- and di-isocyanate monomers, and said composition being heat curable upon exposure to heat.

In another aspect, the present invention relates to a low volatile-organics, two-component, heat curable coating composition having a viscosity as measured by ZAHN cup 2 of less than about 200 seconds and consisting essentially of at least one polyisocyanate, a fluorine-containing active hydrogen-containing compound alone or in combination with a fluorine-free active hydrogen-containing compound, a solvent in an amount of between 0% and 45% by weight based upon the amount of said polyisocyanate in said composition, and a trimerization catalyst, said composition being essentially free of any mono- and di-isocyanate monomers, and said composition being heat curable upon exposure to heat.

In yet another aspect, the present invention relates to a low volatile organics-containing, one-component, moisture curable coating composition having a viscosity as measured by ZAHN cup 2 of less than about 200 seconds and consisting essentially of at least one polyisocyanate prepolymer which is the reaction product of a polyisocyanate with a fluorine-containing, active hydrogen-containing compound alone or in combination with a fluorine-free active hydrogen-containing compound, a solvent in an amount of between 0% and 45% by weight based upon the amount of said composition, and a tertiary amine catalyst, said composition being essentially free of any mono- and di-isocyanate monomers, and said composition being moisture curable upon exposure to atmospheric or added moisture.

In still another aspect, the present invention relates to a low volatile organics-containing, two-component, moisture curable coating composition having a viscosity as measured by ZAHN cup 2 of less than about 200 seconds and consisting essentially of at least one polyisocyanate, a fluorine-containing, active hydrogen-containing compound alone or in combination with a fluorine-free active hydrogen-containing compound, a solvent in an amount of between 0% and 45% by weight based upon the amount of said polyisocyanate in said composition, and a tertiary amine catalyst, said composition being essentially free of any volatile mono- and di-isocyanates, and said composition being moisture curable upon exposure to atmospheric or added moisture.

In yet another aspect, the present invention relates to a process for providing a slippery coating on a substrate which comprises:

(a) contacting said substrate with a low volatile-organics, one-component, heat curable coating composition to form a coating on said substrate, said coating composition having a viscosity as measured by ZAHN cup 2 of less than about 200 seconds and consisting essentially of at least one blocked polyisocyanate, a fluorine-containing active hydrogen-containing compound alone or in combination with a fluorine-free active hydrogen-containing compound, a solvent in an amount of between 0% and 45% by weight based upon the amount of said polyisocyanate in said composition, and a trimerization catalyst, said composition being essentially free of any mono- and di-isocyanate monomers, and (b) heating said coating to a curing temperature of between 120° F. and 350° F. for a curing time of between about ten minutes and about six hours in order to cure said coating by trimerizing at least some isocyanate groups of said polyisocyanate to provide a heat-cured coating on said substrate, said heat-cured coating being characterized by a contact angle of greater than 63 degrees.

In still another aspect, the present invention relates to a process for providing a slippery coating on a substrate which comprises:

(a) contacting said substrate with a low volatile-organics, two-component, heat curable coating composition to form a coating on said substrate, said coating composition having a viscosity as measured by ZAHN cup 2 of less than about 200 seconds and consisting essentially of at least one polyisocyanate, a fluorine-containing active hydrogen-containing compound alone or in combination with a fluorine-free active hydrogen-containing compound, a solvent in an amount of between 0% and 45% by weight based upon the amount of said polyisocyanate in said composition, and a trimerization catalyst, said composition being essentially free of any mono- and di-isocyanate monomers, and (b) heating said coating to a curing temperature of between 120° F. and 350° F. for a curing time of between about ten minutes and about six hours in order to cure said coating by trimerizing at least some isocyanate groups of said polyisocyanate to provide a heat-cured coating on said substrate, said heat-cured coating being characterized by a contact angle of greater than 63 degrees.

In still another aspect, the present invention relates to a process for providing a slippery coating on a substrate which comprises:

(a) contacting said substrate with a low volatile organics-containing, one-component, moisture curable coating composition to form a coating on said substrate, said coating composition having a viscosity as measured by ZAHN cup 2 of less than about 200 seconds and consisting essentially of at least one polyisocyanate prepolymer which is the reaction product of a polyisocyanate with a fluorine-containing, active hydrogen-containing compound alone or in combination with a fluorine-free active hydrogen-containing compound, a solvent in an amount of between 0% and 45% by weight based upon the amount of said composition, and a tertiary amine catalyst, said composition being essentially free of any mono- and di-isocyanate monomers, and said composition being moisture curable upon exposure to atmospheric or added moisture, and (b) exposing said coating to atmospheric or added moisture to provide a moisture-cured coating on said substrate, said moisture-cured coating being characterized by a contact angle of greater than 63 degrees.

In yet another aspect, the present invention relates to a process for providing a slippery coating on a substrate which comprises:

(a) contacting said substrate with a low volatile organics-containing, two-component, moisture curable coating composition to form a coating on said substrate, said coating composition having a viscosity as measured by ZAHN cup 2 of less than about 200 seconds and consisting essentially of at least one polyisocyanate, a fluorine-containing, active hydrogen-containing compound alone or in combination with a fluorine-free active hydrogen-containing compound, a solvent in an amount of between 0% and 45% by weight based upon the amount of said polyisocyanate in said composition, and a tertiary amine catalyst, said composition being essentially free of any volatile mono- and di-isocyanates, and said composition being moisture curable upon exposure to atmospheric or added moisture, and (b) exposing said coating to atmospheric or added moisture to provide a moisture-cured coating on said substrate, said moisture-cured coating being characterized by a contact angle of greater than 63 degrees.

In still another aspect, the present invention relates to a coated substrate produced by the above-described processes.

These and other aspects will become apparent upon reading the following detailed description of the invention.

DETAILED DESCRIPTION OF THE INVENTION

Without wishing to be bound to any particular theory, it has now been surprisingly found in accordance with the present invention that the use of fluorine-containing monoahls in low VOC polyisocyanate-based coating compositions provides coatings characterized by enhances slipperiness characteristics on the outer surface thereof as measured by increased contact angle measurements relative to fluorine-free coatings, without compromising the adhesion characteristics of the coating to the underlying substrate to which the coating is bonded. This enhanced slipperiness result is believed by the present inventors to be attributable, at least in part, to an apparent tendency of the fluorine atoms in the coating to migrate to the outer surface of the coating, thereby increasing the contact angle values for the coating's outer surface.

The present invention provides so-called "one-component" and "two-component" coating compositions that have very low VOCs, are moisture or heat curable, and are useful for coating a wide variety of substrates. A heat-curable, one-component coating composition advantageously consists essentially of either a "blocked" or unblocked polyisocyanate or polyisocyanate prepolymer, a fluorine-containing active hydrogen-containing compound (also referred to herein as a "monoahl") or a combination of such fluorine-containing compound with a fluorine-free monoahl, a trimerization catalyst to facilitate heat curing of the composition, and an optional solvent. The moisture curable, one-component composition typically employs a tertiary amine catalyst to facilitate the moisture cure. Therefore, the moisture curable, one-component coating composition consists essentially of a polyisocyanate prepolymer, which is the reaction product of a polyisocyanate with a fluorine-containing active hydrogen-containing compound, or a combination of such fluorine-containing compound with a fluorine-free monoahl, a tertiary amine catalyst to facilitate moisture curing of the composition, and an optional solvent. The use of some amount of fluorine-free monoahl is advantageous since it aids in viscosity reduction for the one-component composition and provides a relatively inexpensive source of "bulk" for the coating composition. The two-component composition, which can be either moisture curable or heat curable will typically comprise an A-side and a B-side, wherein the A-side consists essentially of a polyisocyanate and an optional solvent, and the B-side consists essentially of a trimerization catalyst and/or a tertiary amine catalyst and an active-hydrogen containing compound selected from the group consisting of monoahls, polyols, imines (such as ketimines and aldimines), oxazolidines, and combinations thereof. It is preferable to use the two-component composition for applications requiring the incorporation of pigment into the coating, since pigments normally contain water which is not easily removed. The pigments thus can be incorporated into the B-side which is not sensitive to moisture, in contrast to the moisture sensitivity of unblocked polyisocyanates in a one-component composition.

The coating composition of the present invention is a low volatile-organics (so-called "low VOC") coating composition having a viscosity as measured by ZAHN cup 2 of less than about 200 seconds and consisting essentially of at least one polyisocyanate, a solvent in an amount of between 0% and 45% by weight based upon the amount of said polyisocyanate in said composition, and a trimerization and/or tertiary amine catalyst, said composition being essentially free of any volatile mono- and di-isocyanates. The composition is curable by trimerization of isocyanate groups of the polyisocyanate using a trimerization catalyst upon exposure to heat at a temperature of between 120° F. and 350° F. for a curing time of between about ten minutes and about six hours, or by exposure to water at an ambient or elevated temperature for a curing time of between about 10 minutes and about 6 hours in the presence of a tertiary amine catalyst for promoting the water-isocyanate reaction.

Useful trimerization catalysts, for use in preparing heat curable coating compositions, include the following: phosphines as described in U.S. Pat. No. 3,645,979; phosphorus acid triamides as described in U.S. Pat. No. 4,614,785; aminosilyl catalysts such as aminosilanes, diaminosilanes, silylureas, and silazanes as described in U.S. Pat. No. 4,412,073; alkali alcoholates and phenolates, alkali carboxylates and alkali hydroxides as described in U.S. Pat. No. 2,978,449; tertiary amines as described in U.S. Pat. No. 3,745,133 and U.S. Pat. No. 3,981,829, aminimides as described in U.S. Pat. No. 4,067,830; quaternary ammonium carboxylates as described in U.S. Pat. No. 4,454,317 and U.S. Pat. No. 4,801,663; quaternary ammonium hydroxides as described in U.S. Pat. No. 4,324,879 and U.S. Pat. No. 5,124,427; Mannich bases, such as those based on nonylphenol, formaldehyde and dimethylamine as described in U.S. Pat. No. 3,996,223 and U.S. Pat. No. 4,115,373; and the like. The catalyst is suitably employed in an amount of between about 0.01% and about 5%, based upon the weight of the coating composition. Optionally, additional catalysts known to promote the reaction of isocyanates with other substituents, e.g. alcohols, may be utilized as desired, and such use is particularly advantageous in two-component systems. Such additional catalysts, for example dibutyltin dilaurate and stannous octoate, are suitably employed in an amount of between about 0.01% and 5%, based upon the weight of the coating composition.

In preparing moisture curable coating compositions, tertiary amine catalysts are advantageously employed in order to promote the water-isocyanate reaction. Useful tertiary amines include hydroxyl-free tertiary amines, as well as hydroxyl-containing tertiary amine catalysts. Illustrative tertiary amine catalysts include the following: bis(N,N'-dimethylaminoethyl)ether, tris(dimethylaminopropyl)amine, N,N'-dimethylpiperazine, and pentamethyl-dipropylene triamine. Preferred tertiary amine catalysts are the hydroxyl-containing tertiary amines, including N,N'-dimethylethanolamine, N,N-dimethylamino-ethoxyethanol, N,N'-dimethylaminoethyl-N-methylethanolamine, N,N-dimethyl-N',N'-2-hydroxypropyl-1,3-propylene diamine, N,N,N'-trimethyl-N'-hydroxyethyl-bis(amino ethyl)ether, N,N-bis(3-dimethylaminopropyl)amino-2-propanol. The tertiary amine catalyst is suitably employed in an amount of between about 0.1% and about 5%, based upon the weight of the coating composition. Optionally, additional catalysts which promote polymer-forming reactions, such as the above-described dibutyltin dilaurate and stannous octoate catalysts can be employed. Such additional catalysts are suitably employed in the coating composition in an amount of between about 0.01% and about 1% by weight, based upon the weight of the coating composition.

As a measure of the viscosity of the coating composition employed in the present invention, the ZAHN cup 2 test is performed in accordance with ASTM D4212-88. Briefly, the ZAHN cup 2 test is performed by dipping a measured cup having a bottom hole into the test composition, followed by removal of the cup and measurement of the amount of time in seconds until a break occurs in the flow stream of test composition passing through the bottom hole. For purposes of comparison, the viscosities as measured by Zahn cup No. 2 can be converted to approximate kinematic viscosities, if desired, by a computation using the following equation:

$$\text{viscosity (in centistokes)} = 2.93(t) - 500/(t)$$

where t is the viscosity in seconds as measured by the Zahn cup No. 2 test regimen.

The polyisocyanates useful in the process of the present invention are those containing one or more of the following: biuret groups, isocyanurate groups (such as cyclotrimerized isocyanate groups), uretidione groups, allophanate groups, urethane groups and combinations thereof. The polyisocyanate suitably has an average functionality of at least 2, preferably between 2.5 and 6, most preferably between 3 and 6. Suitable polyisocyanates include aliphatic polyisocyanates, aromatic polyisocyanates, and combinations thereof, but preferably at least some amount of an aliphatic polyisocyanate is employed in the process of the present invention. Polyisocyanates containing aliphatically and/or cycloaliphatically bound isocyanate groups are preferred for the production of light-stable coatings.

In preparing heat curable coating compositions, blocking agents are suitably employed to block one or more of the isocyanate groups on the polyisocyanate if desired. Heat unblocking of the polyisocyanate is then effected at the desired temperature as a prelude to the coating formation. Suitable blocking agents include those well-known in the art such as, for example, aromatic alcohols such as phenol, cresols, trimethyl phenols and tert-butyl phenols; tertiary alcohols such as tert-butanol, tert-amyl alcohol, and dimethyl phenyl carbinol; compounds which readily form enols such as ethyl acetoacetate, acetyl acetone and malonic acid diethyl ester; secondary aliphatic and aromatic amines such as dibutyl amine, N-methyl aniline, the N-methyl toluidines, N-phenyl toluidine and N-phenyl xylidine; imides such as succinimide; lactams such as e-caprolactam and d-valerolactam; oximes such as butanone oxime and cyclohexanone oxime; mercaptans, such as methyl mercaptan, ethyl mercaptan, butyl mercaptan, 2-mercapto-benzothiazole, alpha-naphthyl mercaptan and dodecyl mercaptan; triazoles such as 1-H-1,2,4-triazole; and pyrazoles such as 3,5-dimethylpyrazole, 3-methylpyrazole, 4-nitro-3,5-dimethylpyrazole, and 4-bromo-3,5-dimethylpyrazole.

The polyisocyanates are prepared by the known modification of simple organic diisocyanates, typically resulting in the formation of biuret, uretidione, allophanate, urethane or isocyanurate groups, or the simultaneous formation of isocyanurate and uretidione groups. Any excess of unmodified monomeric starting isocyanate still present after the modification reaction is suitably removed in a known manner, such as distillation, to provide a polyisocyanate that is essentially free of volatile diisocyanate. The term "essentially free of volatile diisocyanate" as used herein is intended to designate that the polyisocyanate contains no greater than 0.7%, preferably no greater than 0.5%, most preferably no greater than 0.2%, by weight of volatile diisocyanate based upon the weight of the polyisocyanate.

Diisocyanates suitable for use in the preparation of the polyisocyanates include, for example, 2,4- and/or 2,6 diisocyanatotoluene, 4,4'-diisocyanato-dicyclohexylmethane, hexamethylene diisocyanate ("HDI"), and 1-isocyanato-3,3,5-trimethyl-5-isocyanatomethyl-cyclohexane ("IPDI"), 1,4-butanediisocyanate, 1-methyl-2,4-diisocyanatocyclohexane, 1-methyl-2,6-diisocyanatocyclohexane, 4,4'-methylene-bis-(cyclohexyl isocyanate), 2-methyl-1,5-diisocyanatopentane, 2-ethyl-1,4-diisocyanatobutane, 2,4,4-trimethylhexamethylene-1,6-diisocyanate, a,a'-diisocyanato-1,3-dimethylbenzene, a,a'-diisocyanato-1,3-dimethylcyclohexane, a,a'-diisocyanato-1,4-dimethylbenzene, a,a'-diisocyanato-1,4-dimethylcyclohexane, 1,3-diisocyanatocyclohexane, 1,4-diisocyanatocyclohexane wherein "a" denotes "alpha". The polyisocyanates may also be suitably prepared from mixtures of these, or other, diisocyanates, and mixtures of a polyisocyanate with a non-volatile isocyanate, such as octadecyl-isocyanate, are also suitable for use within the scope of the present invention. Preferably, aliphatic or cycloaliphatic diisocyanates are utilized as starting materials for preparing the polyisocyanates. HDI and IPDI are the most preferred starting materials for the preparation of polyisocyanates. Thus, most preferred polyisocyanates include tris-(isocyanatohexyl)-biuret, tris-(isocyanatohexyl)-isocyanurate, cyclodimerized HDI and mixtures thereof, as well as mixtures of these oligomeric polyisocyanates with their higher homologues. Trimerized HDI is available under the trademark of LUXATE, a product of Olin Corporation, as well as under the trademark DESMODUR, a product of Miles Inc.

The coating compositions of the present invention must contain at least some amount of fluorine-containing active hydrogen-containing compound, preferably an amount of between about 0.05 and about 10% weight percent, based upon the weight of the coating composition. The coating composition may optionally contain fluorine-free monoahl(s) and/or polyol(s), and one or more of these components may be desirable in order to avoid any unnecessary extra expense associated with using all fluorine-containing active hydrogen-containing compounds while also avoiding shrinkage problems during curing of the coating composition on the desired substrate, the latter problem being one that sometimes occurs when no (or too small an amount of) active hydrogen-containing compound is employed in the coating composition. In any event, the total amount of active hydrogen-containing compound is advantageously between about 0.05 and about 10% weight percent based upon the weight of the coating composition.

The active hydrogen-containing compound useful in the process of the present invention is suitably selected from the group consisting of monoahls, polyols, imines (such as ketimines and aldimines), oxazolidines, and combinations thereof, preferably having a weight average molecular weight of between about 50 and about 10,000, more preferably between about 100 and about 5,000, most preferably about 200 and about 2,000.

The term "monoahl" is intended to designate compounds having only one active hydrogen group. An active hydrogen group is a group which has a hydrogen atom which, because of its position in the molecule, displays activity according to the Zerewitnoff test described by Woller in the Journal of American Chemical Society, Vol. 49, page 3181(1927). Illustrative of such active hydrogen groups are —OH, —NH—, —COOH, —SH and —CONH—. Typical monoahls suitable for this invention include monoalcohols, monoamines, thiols, amides and imines. Suitable monoalcohols are the aliphatic or cycloaliphatic alcohols, optionally containing ester or ether linkages. Preferred monoahls are monohydric polyethers and monohydric polyesters. Monohydric polyethers are prepared by the polymerization of alkylene oxides with alcohols. Alcohols which may be employed in the polymerization include C1–C30(cyclo)aliphatic straight- or branched-chain alcohols, such as methanol, ethanol, propanol, isopropanol, butanol, hexanol, cyclohexanol, and the like, and mixtures thereof. Illustrative alkylene oxides used in the polymerization include ethylene oxide, propylene oxide, butylene oxide, and the like. Monohydric polyesters are most readily prepared by the polymerization of lactones such as butyrolactone, valerolactone, caprolactone, and the like reacted with alcohols, such as the alcohols described above. Suitable alcohols include the alcohols described above for polymerization with alkylene oxides.

Suitable monoamines are aliphatic or cycloaliphatic, primary or secondary amines. Preferred amines are poly(alkyleneoxy)alkylamines.

Polyols suitable for the present invention include polyether polyols and polyester polyols. The preferred polyols useful in the present invention have a functionality of about 2 in order to prevent the formation of very high molecular weight polyurethane prepolymers which result in coating viscosities higher than desired for ready application. The polyether polyols are prepared by polymerization of alkylene oxides with water, polyhydric alcohols with two to eight hydroxyl groups, or amines. Polyester polyols include the condensation products of polycarboxylic acids with polyhydric alcohols.

In preparing the polyisocyanate prepolymers useful in the present invention, and in utilizing the polyisocyanates in both the one-component and two-component systems of the present invention, the ratio of NCO equivalents in the polyisocyanate to the OH equivalents in the active hydrogen-containing compound can vary over a wide range of between about 2:1 and about 10,000:1, preferably between about 2.5:1 and about 2,000:1, most preferably between about 3:1 and about 2,000:1.

The coating compositions employed in the process of the present invention suitably contain small quantities of isocyanate-inert solvents in amounts of between 0% and 45% by weight, based upon the weight of the coating composition. It is preferred to minimize the amount of solvent utilized in the coating compositions of the present invention in order to minimize the VOC of the coating composition itself. However, some amount of solvent may be required in order to provide a desired low viscosity for the coating composition of less than about 200 seconds as measured by Zahn cup #2. Suitable solvents include toluene, xylene, butyl acetate, methyl ethyl ketone, methyl isobutyl ketone, methylamyl ketone, ethylethoxy propionate, ethoxyethylacetate, an aromatic hydrocarbon mixture having a boiling point of 152–174° C., combinations thereof, and the like. Other optional additives are suitably employed, if desired, such as, for example, uv stabilizers; leveling agents; flow-aids; pigments, such as titanium dioxide; plasticizers; and/or other resins.

The coating compositions made in accordance with the process of the present invention are suitable for use in the production of clear or pigmented coatings, and may be applied to a desired substrate by conventional methods, such as spread coating, roller application or spraying. Because of the low viscosity of the compositions of the present invention, they are especially suitable for application by conventional spray techniques. The coating thickness on the substrate can vary over a wide range, although a dry film coating thickness of between about 0.01 and 0.5 millimeters is preferred.

Substrates for the coating useful in the present invention are suitably selected from a wide range of materials such as other plastics, such as polyethylene or polystyrene, wood and paper substrates, and metal substrates, such as sheet steel or aluminum.

The coating compositions of the present invention are stable in storage when heat and moisture are excluded and they harden under the influence of heat and/or moisture to form coatings. As stated above, when hardening or curing of the coatings on the substrate in accordance with the invention is carried out by exposure to heat, the temperature employed is between 120° F. and 350° F. for a curing time of between about ten minutes and about six hours. When curing is effected by exposure to moisture, an ambient or elevated temperature is suitably employed using a curing time of between about ten minutes and about six hours.

The coatings of the present invention are suitable for use in the production of automotive clear coatings or undercoats, floor covering coatings, wall coatings, transportation coatings, maintenance coatings, and the like, or any other application where a low VOC coating composition is desired for use on a substrate. The "slippery" coatings produced in accordance with the present invention provide particular advantages in coatings applications requiring anti-graffiti characteristics, acid etch resistance, and easy dirt removal, in either indoor or outdoor applications. These slippery coatings generally provide a contact angle for deionized water of greater than 63 degrees, preferably greater than 80 degrees, more preferably greater than 90 degrees.

While the invention has been described above with reference to specific embodiments thereof, it is apparent that many changes, modifications and variations can be made without departing from the inventive concept disclosed herein. Accordingly, it is intended to embrace all such changes, modifications and variations that fall within the spirit and broad scope of the appended claims. All patent applications, patents and other publications cited herein are incorporated by reference in their entirety.

The following examples are intended to illustrate, but in no way limit the scope of, the present invention.

EXAMPLES

The following products were utilized in the examples given hereinbelow:

Monoahl A is an ethoxylated/propoxylated alcohol initiated with trifluoroethanol and having an average molecular weight of about 505.

Monoahl B is a mixture of ethoxylated/propoxylated C6–C10 alcohols having an average molecular weight of about 530.

Monoahl C is a mixture of perfluoroalkylsulfonamido alcohols sold under the tradename of FC-10 Fluorad Brand Fluorochemical Alcohol by 3M equivalent weight 570–590 (56.5% Fluorine).

Monoahl D is a fluorinated monoether alcohol sold under the tradename of Zonyl FSO 100 Fluorosurfactant by DuPont, equivalent weight 720–740.

Polyisocyanate A is a trimerized 1.6 hexamethylene diisocyanate (% NCO=21–23).

Polyisocyanate B is a trimerized 1,6-hexamethylene diisocyanate blocked with 3,5-dimethylpyrazole, as a 75% solution in n-butyl acetate and Aromatic 100 from Exxon (% NCO=9.6–10.5).

Catalyst A is 2-((2-(2-(dimethylamino)ethoxy) ethyl)methylamino)ethanol and sold under the tradename of Texacat ZF-10 by Texaco.

Catalyst B is a 5% solution of dibutyltin dilaurate in toluene.

Flow-aid A is an acrylic flow and leveling agent sold as a 60% solids solution in xylene under the tradename Coroc A-620-A2 by Freeman Polymers.

Preparation of Coating Compositions-Examples and Comparisons

Example 1

Preparation of one-component moisture cured system

A 500-ml, 3-necked flask was charged with 40 g of Monoahl A, 3.0 g of Catalyst A, 0.4 g of Catalyst B, 0.8 g of Flow-aid A, 42.5 g of butyl acetate (BA), and 42.5 g of ethylethoxypropionate (EEP). The flask was placed under positive nitrogen pressure while 163 g of Polyisocyanate A was added to the mixture. The resulting mixture was then heated to 80° C. and was stirred at that temperature for 3 hours to complete the reaction. The resultant coating composition had a viscosity of 31 seconds by No. 2 Zahn cup at 20° C.

Example 2

Preparation of one-component moisture cured system

A 500-ml, 3-necked flask was charged with 20 g of Monoahl B, 10 g of fluoroethanol, 4.4 g of Catalyst A, 0.6 g of Catalyst B, 1.2 g of Flow-aid A, 57 g of butyl acetate (BA), and 57 g of ethylethoxypropionate (EEP). The flask was placed under positive nitrogen pressure while 267 g of Polyisocyanate A was added to the mixture. The resulting mixture was then heated to 60° C. and was stirred at that temperature for 3 hours to complete the reaction. The resultant coating composition had a viscosity of 37 seconds by No. 2 Zahn cup at 20° C.

Example 3

Preparation of one-component moisture cured system

A 500-ml, 3 necked flask was charged with 8 g of 1,1-dihydroheptafluorobutanol, 1.3 g of Catalyst A, 0.17 g of Catalyst B, 0.35 g of Flow-aid A, 17 g of butyl acetate (BA), and 17 g of ethylethoxypropionate (EEP). The flask was placed under positive nitrogen pressure while 80 g of Polyisocyanate A was added to the mixture. The resulting mixture was then heated to 80° C. and was stirred at that temperature for 3 hours to complete the reaction. The resultant coating composition had a viscosity of 31 seconds by No. 2 Zahn cup at 20° C.

Example 4

Preparation of one-component moisture cured system

A 500-ml, 3-necked flask was charged with 24 g of Monoahl C, 1.5 g of Catalyst A, 0.2 g of Catalyst B, 0.41 g of Flow-aid A, 20 g of butyl acetate (BA), and 20 g of ethylethoxypropionate (EEP). The flask was placed under positive nitrogen pressure while 80 g of Polyisocyanate A was added to the mixture. The resulting mixture was then heated to 80° C. and was stirred at that temperature for 3 hours to complete the reaction. The resultant coating composition had a viscosity of 32 seconds by No. 2 Zahn cup at 20° C.

Example 5

Preparation of one-component moisture cured system

A 500-ml, 3-necked flask was charged with 11.9 g of Monoahl C, 10.8 g of Monoahl B, 1.5 g of Catalyst A, 0.2 g of Catalyst B, 0.4 g of Flow-aid A, 20 g of butyl acetate (BA), and 20 g of ethylethoxypropionate (EEP). The flask was placed under positive nitrogen pressure while 80 g of Polyisocyanate A was added to the mixture. The resulting mixture was then heated to 80° C. and was stirred at that temperature for 3 hours to complete the reaction. The resultant coating composition had a viscosity of 32 seconds by No. 2 Zahn cup at 20° C.

Example 6

Preparation of one-component moisture cured system

A 500-ml, 3-necked flask was charged with 6.0 g of Monoahl C, 15.8 g of Monoahl B, 1.5 g of Catalyst A, 0.2 g of Catalyst B, 0.4 g of Flow-aid A, 20 g of butyl acetate (BA), and 20 g of ethylethoxypropionate (EEP). The flask was placed under positive nitrogen pressure while 80 g of Polyisocyanate A was added to the mixture. The resulting mixture was then heated to 80° C. and was stirred at that temperature for 3 hours to complete the reaction. The resultant coating composition had a viscosity of 31 seconds by No. 2 Zahn cup at 20° C.

Example 7

Preparation of one-component moisture cured system

A 500-ml, 3-necked flask was charged with 30 g of Monoahl D, 1.6 g of Catalyst A, 0.22 g of Catalyst B, 0.44 g of Flow-aid A, 21 g of butyl acetate (BA), and 21 g of ethylethoxypropionate (EEP). The flask was placed under positive nitrogen pressure while 80 g of Polyisocyanate A was added to the mixture. The resulting mixture was then heated to 80° C. and was stirred at that temperature for 3 hours to complete the reaction. The resultant coating composition had a viscosity of 38 seconds by No. 2 Zahn cup at 20° C.

Example 8

Preparation of two-component moisture cured system

A 16-oz, wide-mouth bottle was charged with 52 g of ethylethoxypropionate (EEP), 1.5 g of Catalyst A, 0.2 g of Catalyst B, 0.4 g of Flow-aid A, 1.0 g of Mono-ol C, 20 g of Monoahl B, and 80 g of Polyisocyanate A. The resulting mixture was stirred with a spatula to produce the coating composition as a clear, homogeneous solution used immediately to prepare coatings.

Example 9

Preparation of two-component moisture cured system

A 16-oz, wide-mouth bottle was charged with 52 g of ethylethoxypropionate (EEP), 1.5 g of Catalyst A, 0.2 g of Catalyst B, 0.4 g of Flow-aid A, 3.0 g of Mono-ol C, 20 g of Monoahl B, and 80 g of Polyisocyanate A. The resulting mixture was stirred with a spatula to produce the coating composition as a clear, homogeneous solution, used immediately after mixing to prepare coatings.

Comparative Example 1

Preparation of two-component moisture cured system without added fluorocompound

A 16-oz, wide-mouth bottle was charged with 52 g of ethylethoxypropionate (EEP), 1.5 g of Catalyst A, 0.2 g of Catalyst B, 0.4 g of Flow-aid A, 20 g of Monoahl B, and 80 g of Polyisocyanate A. The resulting mixture was stirred with a spatula to produce the coating composition as a clear, homogeneous solution, used immediately after mixing to prepare coatings.

Example 10

Preparation of two-component heat cured system

A 500-ml, 3-necked flask was charged with 3.7 g of Monoahl C, 7.4 g of Monoahl B, 0.44 g of Catalyst B. The flask was placed under positive nitrogen pressure while 29.59 g of Polyisocyanate A was added to the mixture. The resulting mixture was then heated to 80° C. and was stirred at that temperature for 3 hours to complete the reaction. To the above solution were added, 7.8 g of toluene, 11.8 g of ethyl 3-ethoxypropionate and 0.39 g of potassium trifluoroacetate (20% solution in triethylene glycol monomethyl ether). The obtained solution was then immediately used to prepare coatings.

Example 11

Preparation of two-component heat cured system

A 500-ml, 3-necked flask was charged with 3.9 g of Monoahl C, 7.83 g of Monoahl B, 0.47 g of Catalyst B. The flask was placed under positive nitrogen pressure while 31.33 g of Polyisocyanate A was added to the mixture. The resulting mixture was then heated to 80° C. and was stirred at that temperature for 3 hours to complete the reaction. To the above solution were added, 7.8 g of toluene, 11.8 g of ethyl 3-ethoxypropionate and 0.39 g of potassium trifluoroacetate (20% in triethylene glycol monomethyl ether). The obtained solution was then immediately used to prepare coatings.

Example 12

Preparation of two-component heat cured system

A 500-ml, 3-necked flask was charged with 0.04 g of Monoahl C, 7.88 g of Monoahl B, 0.47 g of Catalyst B. The flask was placed under positive nitrogen pressure while 31.52 g of Polyisocyanate A was added to the mixture. The resulting mixture was then heated to 80° C. and was stirred at that temperature for 3 hours to complete the reaction. To the above solution were added, 7.8 of toluene, 11.8 g of ethyl 3-ethoxypropionate, and 0.39 g of potassium trifluoroacetate (20% solution in triethylene glycol monomethyl ether). The obtained solution was then immediately used to prepare coatings.

Preparation of one-component heat cured system

A 500-ml, 3-necked flask was charged with 0.39 g of Monoahl C, 7.83 g of Monoahl B, 0.47 g of Catalyst B. The flask was placed under positive nitrogen pressure while 62 g of Polyisocyanate B was added to the mixture. To the above solution were added, 7.8 of toluene, 11.8 g of ethyl 3-ethoxypropionate, and 0.39 g of potassium trifluoroacetate (20% solution in triethylene glycol monomethyl ether). The resulting mixture was stirred at room temperature for 15 minutes. The obtained solution of a one-component system was used to prepare coatings (coating example 27).

Comparative Example 2

Preparation of two-component moisture cured system without added fluorocompound

A 500-ml, 3-necked flask was charged with 7.88 g of Monoahl B, 0.47 g of Catalyst B. The flask was placed under positive nitrogen pressure while 31.54 g of Polyisocyanate A was added to the mixture. The resulting mixture was then heated to 80° C. and was stirred at that temperature for 3 hours to complete the reaction. To the above solution were added, 7.8 g of toluene, and 11.8 g of ethyl 3-ethoxypropionate, and 0.39 g of potassium trifluoroacetate (20% in triethylene glycol monomethyl ether). The obtained solution was then immediately used to prepare coatings.

Testing of Coatings Made Using the Above Compositions

Examples 14–23

The coating compositions prepared in Examples 1–9 and Comparative Example 1 were sprayed at 45 psi using a conventional spray gun (model #DH6500 from Binks Mfg. Co.) on cold-rolled steel panels. A small portion of the coating composition was used to coat a glass strip which was placed in a BK Drying Recorder (Paul N. Gardner Company, Inc.) to determine the drying time. The recorder uses a tracking needle to determine the solvent evaporation time, the gel time and the surface-dry time. The drying time determinations were made at 20° C. and 50% relative humidity.

The coated test panels were allowed to cure at ambient temperature and humidity conditions for two weeks before testing for appearance, mechanical properties, and chemical resistance. Pencil hardness was determined according to ASTM D3363-92a. The conical mandrel bend tests were performed using a one-eighth inch tester from BYK-Gardner, Inc. according to ASTM D522-92. Direct and reverse impact values were determined according to ASTM D2794-92 using a variable height impact tester from BYK-Gardner, Inc. Gloss was determined using a micro-TRZ-gloss, multi-angle glossmeter from BYK-Gardner, Inc. Cross-hatch adhesion was determined using a cross-hatch cutter from BYK-Gardner according to ASTM D3359-92 a. Chemical resistance was determined according to ASTM D1308-87. Contact angles for the coatings with deionized water were measured using a Rame-Hart 100-00-115 Contact Angle Analyzer.

Examples 24–28

The coating compositions prepared in Examples 10–13 and Comparative Example 2 were applied to cold-rolled steel panels by drawing down a film of about 2 mils thickness. The coated test panels were cured in an oven held at 147–154° C. Contact angles for the coatings with deionized water were measured using a Rame-Hart 100-00-115 Contact Angle Analyzer.

The results of the various physical property test measurements for the coatings of Examples 1 through 26 are given in Tables 1 and 2 presented hereinbelow. These results demonstrate that improved results, in terms of increased contact angle values, are provided for the coatings of Examples 1–12 (ranging from 64 to 109) made using coating compositions using a fluoro-containing monoalcohol, as compared to the values obtained for Comparative Examples 1 and 2 (values of 55 and 61 degrees, respectively) measured on coatings made using fluorine-free monols.

Although most of the other coatings properties shown in Table 1 are acceptable for a wide variety of applications, those showing a poor result in one or two properties would be suitably utilized in applications not requiring those properties.

TABLE I

Moisture Cure at Room Temperature

| Example | Coating Composition | Solvent Evaporation (min) | Gel Time (min) | Surface Dry (min) | Thickness (mils) | Pencil Hardness | Mandrel Bend | Direct Impact (in/lb) | Reverse Impact (in/lb) |
|---|---|---|---|---|---|---|---|---|---|
| 14 | Example 1 | 20 | 50 | 150 | 1.5 | 4 | Pass | 160 | 160 |
| 15 | Example 2 | 15 | 30 | 120 | 3 | 4 | Pass | 160 | 160 |
| 16 | Example 3 | 50 | 80 | 225 | 2 | 4 | Pass | 160 | 140 |
| 17 | Example 4 | 15 | 30 | 60 | 1.7 | 4 | Pass | 160 | 160 |
| 18 | Example 5 | 15 | 30 | 120 | NT | NT | NT | NT | NT |
| 19 | Example 6 | NT | NT | NT | NT | NT | NT | NT | NT |
| 20 | Example 7 | 20 | 80 | 150 | 1.7 | 4 | Pass | 160 | 160 |
| 21 | Example 8 | NT | NT | NT | NT | NT | NT | NT | NT |
| 22 | Example 9 | NT | NT | NT | NT | NT | NT | NT | NT |
| 23 | Comp. Ex. 1 | NT | NT | NT | NT | NT | NT | NT | NT |

| Example | Gloss (60°) | Gloss (20°) | Crosshatch Adhesion | NaOH (10%) | Chemical HCl (10%) | Resistance CH$_3$COOH (10%) | MEK RUB | Xylene RUB | Contact Angle |
|---|---|---|---|---|---|---|---|---|---|
| 14 | 96% | 94% | Pass | Pass | Fail | Fail | Pass | Pass | 67° |
| 15 | 94% | 107% | Pass | Pass | Pass | Pass | Pass | Pass | 68° |
| 16 | 100% | 115% | Pass | Pass | Pass | Pass | Pass | Pass | 74° |
| 17 | 108% | 90% | Pass | Pass | Pass | Pass | Pass | Pass | 98° |
| 18 | NT | NT | NT | NT | NT | NT | NT | NT | 94° |
| 19 | NT | NT | NT | NT | NT | NT | NT | NT | 93° |
| 20 | 96% | 106% | Pass | Pass | Fail | Fail | Pass | Pass | 82° |
| 21 | NT | NT | NT | NT | NT | NT | NT | NT | 64° |
| 22 | NT | NT | NT | NT | NT | NT | NT | NT | 103° |
| 23 | NT | NT | NT | NT | NT | NT | NT | NT | 55° |

"NT" denotes not tested.

TABLE II

Heat Cure at 147–154° C.

| Example | Coating Composition | Solvent Evaporation (min) | Surface Dry (min) | Thickness (mils) | Pencil Hardness | Mandrel Bend | Direct Impact (in/lb) | Reverse Impact (in/lb) |
|---|---|---|---|---|---|---|---|---|
| 24 | Example 10 | 5 | 30 | NT | 4 | Pass | 160 | 160 |
| 25 | Example 11 | 5 | 30 | NT | 4 | Pass | 160 | 160 |
| 26 | Example 12 | 5 | 30 | NT | 4 | Pass | 160 | 160 |
| 27 | Example 13 | 5 | 90 | 1.8 | 4 | Pass | 160 | 160 |
| 28 | Comp. Ex. 25 | 5 | 30 | NT | 4 | Pass | 160 | 160 |

| Example | Gloss (60°) | Gloss (20°) | Crosshatch Adhesion | NaOH (10%) | Chemical HCl (10%) | Resistance CH$_3$COOH (10%) | MEK RUB | Xylene RUB | Contact Angle |
|---|---|---|---|---|---|---|---|---|---|
| 24 | NT | NT | Pass | Pass | Pass | Pass | NT | NT | 109° |
| 25 | NT | NT | Pass | Pass | Pass | Pass | NT | NT | 98° |
| 26 | NT | NT | Pass | Pass | Pass | Pass | NT | NT | 93° |
| 27 | 103 | 83 | Pass | Pass | Fail | Pass | Pass | Pass | 70° |
| 28 | NT | NT | Pass | Pass | Pass | Pass | NT | NT | 61° |

"NT" denotes not tested.

What is claimed is:

1. A process for providing a slippery coating on a substrate which comprises:
   (a) contacting said substrate with a low volatile-organics, one-component, heat curable coating composition to form a coating on said substrate, said coating composition having a viscosity as measured by ZAHN cup 2 of less than about 200 seconds and consisting essentially of at least one blocked polyisocyanate, a fluorine-containing monoahl alone or in combination with a fluorine-free active hydrogen-containing compound, a solvent in an amount of between 0% and 45% by weight based upon the amount of said polyisocyanate in said composition, and a trimerization catalyst, said composition being essentially free of any mono- and di-isocyanate monomers, and
   (b) heating said coating to a curing temperature of between 120° F. and 350° F. for a curing time of between about ten minutes and about six hours in order to cure said coating by trimerizing at least some isocyanate groups of said polyisocyanate to provide a heat-cured coating on said substrate,
   said heat-cured coating being characterized by a contact angle of greater than 63 degrees.

2. A process for providing a slippery coating on a substrate which comprises:
   (a) contacting said substrate with a low volatile-organics, two-component, heat curable coating composition to form a coating on said substrate, said coating composition having a viscosity as measured by ZAHN cup 2 of less than about 200 seconds and consisting essentially of at least one polyisocyanate, a fluorine-containing monoahl alone or in combination with a fluorine-free active hydrogen-containing compound, a solvent in an amount of between 0% and 45% by weight based upon the amount of said polyisocyanate in said composition, and a trimerization catalyst, said composition being essentially free of any mono- and di-isocyanate monomers, and
   (b) heating said coating to a curing temperature of between 120° F. and 350° F. for a curing time of between about ten minutes and about six hours in order to cure said coating by trimerizing at least some isocyanate groups of said polyisocyanate to provide a heat-cured coating on said substrate,
   said heat-cured coating being characterized by a contact angle of greater than 63 degrees.

3. A process for providing a slippery coating on a substrate which comprises:
   (a) contacting said substrate with a low volatile organics-containing, one-component, moisture curable coating composition to form a coating on said substrate, said coating composition having a viscosity as measured by ZAHN cup 2 of less than about 200 seconds and consisting essentially of at least one polyisocyanate prepolymer which is the reaction product of a polyisocyanate with a fluorine-containing, monoahl alone or in combination with a fluorine-free active hydrogen-containing compound, a solvent in an amount of between 0% and 45% by weight based upon the amount of said composition, and a tertiary amine catalyst, said composition being essentially free of any mono- and di-isocyanate monomers, and said composition being moisture curable upon exposure to atmospheric or added moisture, and
   (b) exposing said coating to atmospheric or added moisture to provide a moisture-cured coating on said substrate,
   said moisture-cured coating being characterized by a contact angle for deionized water on the coating of greater than 63 degrees.

4. A process for providing a slippery coating on a substrate which comprises:
   (a) contacting said substrate with a low volatile organics-containing, two-component, moisture curable coating composition to form a coating on said substrate, said coating composition having a viscosity as measured by ZAHN cup 2 of less than about 200 seconds and consisting essentially of at least one polyisocyanate, a fluorine-containing, monoahl alone or in combination with a fluorine-free active hydrogen-containing compound, a solvent in an amount of between 0% and 45% by weight based upon the amount of said polyisocyanate in said composition, and a tertiary amine catalyst, said composition being essentially free of any volatile mono- and di-isocyanates, and said composition being moisture curable upon exposure to atmospheric or added moisture, and
   (b) exposing said coating to atmospheric or added moisture to provide a moisture-cured coating on said substrate,
   said moisture-cured coating being characterized by a contact angle of greater than 63 degrees.

5. The process of any of claims 1 through 4 wherein said fluorine-containing monoahl is selected from the group consisting of monoahls, polyols, imines and combinations thereof.

6. The process of any of claims 1 through 4 wherein said solvent is selected from the group consisting of toluene, xylene, butyl acetate, methyl ethyl ketone, methyl isobutyl ketone, methylamyl ketone, ethoxyethylacetate, ethylethoxy propionate an aromatic hydrocarbon mixture having a boiling point of 152–174° C., and combinations thereof.

7. The process of any of claims 1 through 4 wherein said polyisocyanate has an average functionality of least 2.

8. The process of any of claims 1 through 4 wherein said fluorine-free active hydrogen-containing compound is selected from the group consisting of monoahls, polyols, imines and combinations thereof.

9. The process of any of claims 1 through 4 wherein said polyisocyanate contains a moiety selected from the group consisting of biuret, uretidione, isocyanurate, urethane, allophanate, and combinations thereof.

10. The process of any of claims 1 through 4 wherein said polyisocyanate is selected from the group consisting of tris-(isocyanatohexyl)-biuret, tris-(isocyanatohexyl)-isocyanurate, cyclodimerized hexamethylene diisocyanate, and combinations thereof.

11. A coated substrate produced by the process of any of claims 1 through 4 and characterized by a fluoro-containing coating on said coated substrate.

* * * * *